Nov. 28, 1961 A. RENKE 3,010,360

APPARATUS FOR REPRODUCING COMPOUND MESSAGES

Filed May 22, 1958 5 Sheets-Sheet 1

INVENTOR:
Adolph Renke
BY Karl F. Ross
AGENT.

INVENTOR:
Adolph Renke
BY
Karl F. Ross
AGENT

Nov. 28, 1961 A. RENKE 3,010,360

APPARATUS FOR REPRODUCING COMPOUND MESSAGES

Filed May 22, 1958 5 Sheets-Sheet 3

INVENTOR:
Adolph Renke
BY Karl F. Ross
AGENT.

INVENTOR:
Adolph Renke
BY
Karl F. Ross
AGENT

Nov. 28, 1961 A. RENKE 3,010,360

APPARATUS FOR REPRODUCING COMPOUND MESSAGES

Filed May 22, 1958 5 Sheets-Sheet 5

INVENTOR:
Adolph Renke
BY Karl F. Ross
AGENT 3,010,360

APPARATUS FOR REPRODUCING COMPOUND MESSAGES

Adolph Renke, Lovell St., Lincolndale, N.Y.
Filed May 22, 1958, Ser. No. 737,042
5 Claims. (Cl. 88—16.2)

My present invention relates to an apparatus for reproducing recorded compound messages, e.g. messages both visual and audible in character such as a motion picture or a television show.

The general object of my invention is to provide an improved and more efficient apparatus for reproducing messages of the character described, involving simple and inexpensive equipment. Another important object of my invention is to provide means for utilizing a new type of carrier for such messages which is easy to manufacture, can be stored indefinitely and is capable of duplication in unlimited quantites by cheap copying methods such as photographic, lithographic and/or similar processes.

In accordance with this invention I provide a carrier of sheet material which bears on one side a record representing one aspect of a compound message, such as a sequence of cinematographic images, and on the other side a record representing a complementary aspect of such message, e.g. a sound track associated with the aforesaid image. If the carrier is in the form of a film strip, it may be reproduced by a substantially conventional talking-picture projector so modified as to have its objective system traversed by light reflected from the front surfaces of the carrier while having its sound pickup facing the rear carrier surface. In a more drastic departure from accepted reproduction technique, however, I utilize as the carrier a series of preferably rectangular sheets which can easily be stacked at the input end of a reproducer having a cylindrical support around which the sheets can be successively wrapped for simultaneous scanning by optical and electro-acoustic pickup means. For this purpose a photoelectric transducer, such as a photocell, may be positioned within the cylinder to scan the sound track of each carrier sheet through the transparent cylinder wall, the optical pickup means including a source of light rays reflected on the rotating outer sheet surface and focused upon a receiving surface by a projection system advantageously including means to compensate for the rotary displacement of each picture frame during the projection thereof. In the presence of a powerful light source permitting the shutter of the projector to be opened for very short periods only, such compensating means may be omitted.

The carrier sheet may consist wholly or partially of paper on which at least the sound portion of the message may be recorded by a conventional printing process. For the picture part I prefer, at least for high-grade reproduction, to utilize photographic recording on an emulsion coating one side of the paper. I have found that reproducibility is improved if a light-reflecting layer, such as a metal foil, is inserted between the paper and the emulsion.

The invention will be described in greater detail with reference to the accompanying drawing in which.

Figure 1:
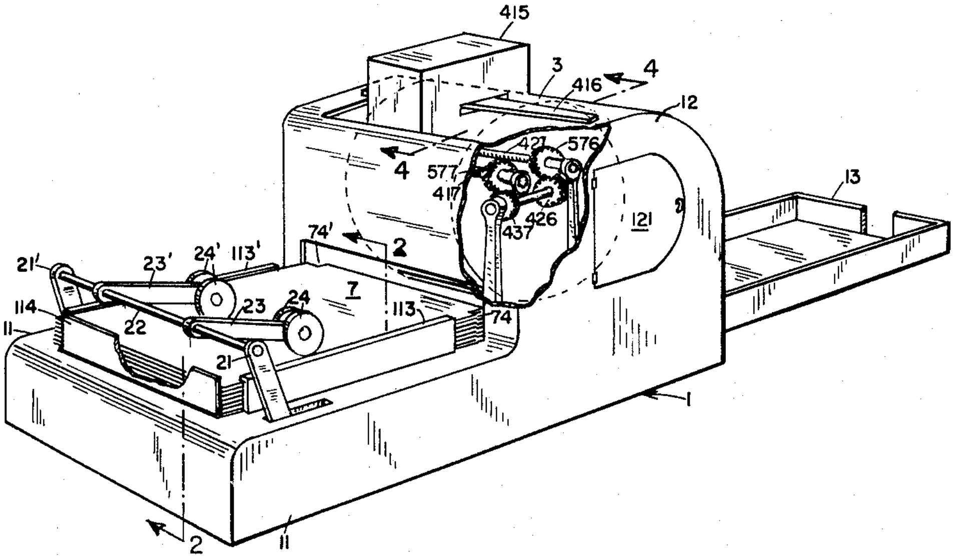
FIG. 1 shows an overall perspective view of a sound and picture reproducer according to the invention.

The main parts of the sound and picture reproducer illustrated in FIGS. 1–8 are: The metal frame 1, the carrier-feeding-and-stripping mechanism 2, the rotating, transparent cylinder 3, the combined picture and sound scanner 4, the driving mechanism 5 for the entire reproducer, and the electric switching system 6 controlling the reproducing, feeding and stripping means which operate upon the carrier 7. The hereinafter described parts of the above components all are designated by numerals beginning with the digits 1–7 respectively assigned to the component as a whole.

In FIG. 1, the metal frame 1 surrounds the whole reproducer. This frame includes a rear portion 11 which holds the stack of carriers 7 and the carrier-feeding mechanism; a center casing 12 enclosing the scanning cylinder 3, the picture scanner 41, the sound scanner 42, components of the driving mechanism 5 and the entire electric control system 6; and a forwardly positioned collecting tray 13 in which the already reproduced carriers are dropped. The center casing 12 has a door 121 through which the inner mechanism is accessible. The figure also shows, on top of the center casing, the hood 415 of the picture scanner 41; the beveled guide ledge 516 of the parallax equalizer is fastened to the center casing.

Figure 2:
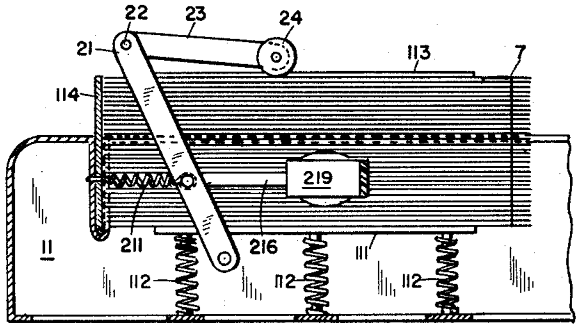
FIG. 2 is a cross-sectional view taken on line 2—2 of FIG. 1.

FIG. 2 shows the rear frame portion 11 which includes a bottom plate 111, urged upwards by a plurality of springs 112, and a rear stop plate 114 which can be removed for insertion of the stack of carriers 7. The topmost carrier sheet abuts against a pair of L-shaped stops 113, 113′ (cf. FIG. 1) mounted on either side of the rear frame portion. The carrier-feeding mechanism is actuated by a solenoid 219, carried by one of the side walls of the frame, whose armature 216 actuates an arm 21. A spring 211 counteracts the solenoid and restores the arm 21 to its rest position. A horizontal rod 22 interconnects arm 21 with an identical arm 21′ (FIG. 1) at the other side of the rear frame portion. Rod 22 carries two reciprocating levers 23, 23′ which, in turn, hold the rollers 24, 24′; the latter are preferably covered with a resilient material, such as rubber. When pushed forward upon energization of the solenoid 216 the rollers 24, 24′ engage the top sheet 7 and push it forward at its lateral edges, adjacent the L-shaped stops 113, 113′, thereupon returning to their retracted position preparatorily to the feeding of the next carrier sheet.

Figure 3:
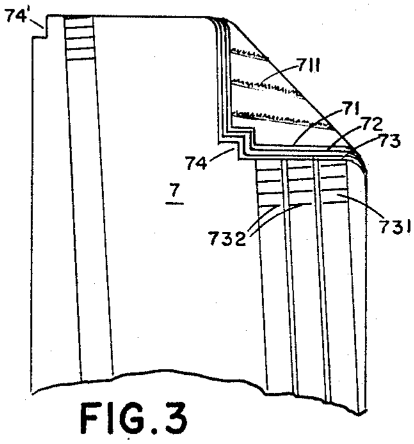
FIG. 3 shows a carrier sheet used in the apparatus of FIGS. 1 and 2.

FIG. 3 illustrates the carrier 7. Its paper base 71 has on one of its surfaces an aluminum or other metallic foil 72 which, according to my invention, considerably improves the light reflection of the photographic picture contained in the emulsion 73 which is applied thereto. Thus the carrier 7 has the picture 731 (embedded in emulsion 73) on its front surface and the conventional sound track 711 (printed on the paper base 71 proper) at its rear surface. Numeral 732 denotes individual frames of a movie sequence. Both picture and sound recordings follow a helical track having a pitch which will bring the traveling edge of a particular track portion to the leading edge of the next portion when the carrier is so wound around the cylinder 3 that the two edges meet. The sound track is on the opposite surface and registers with the particular picture sequence to which it belongs. The forward corners of the sheet are recessed at 74, 74′ to accommodate two stops 301, 301′ projecting from the periphery of cylinder 3.

The sheet 7 may also carry two sets of identical but angularly staggered sound tracks 711 for a purpose to be described hereinafter in connection with FIG. 9.

Figure 4:
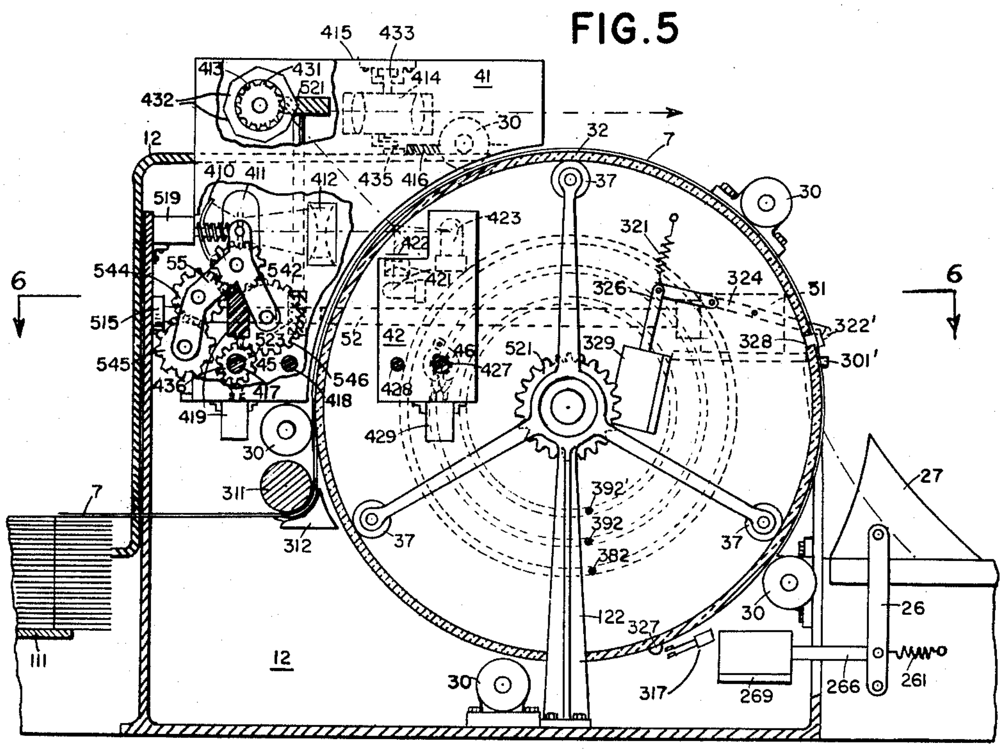
FIG. 4 is a cross-sectional view taken on line 4—4 of FIG. 1.
Figures 6, 7:
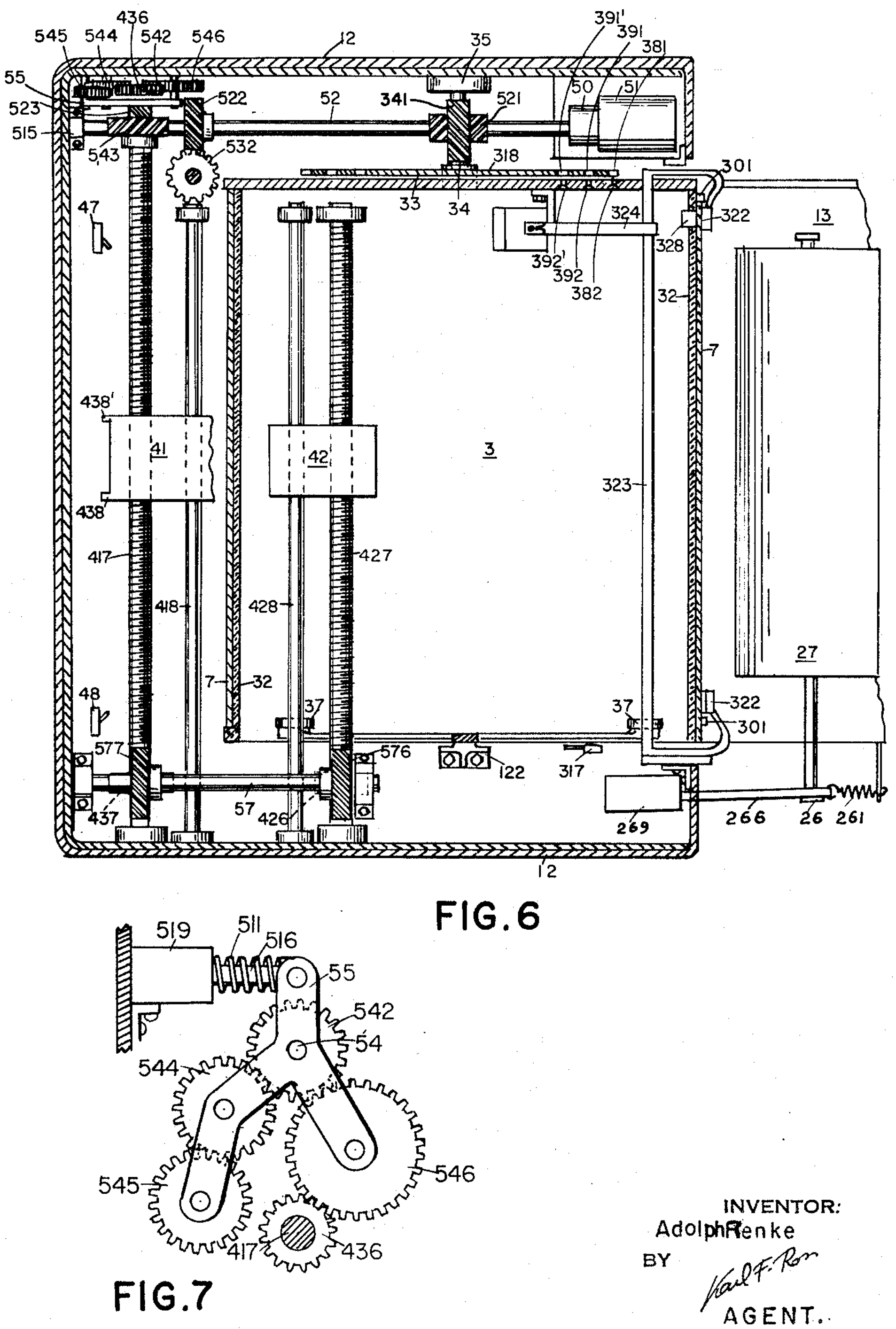
FIG. 6 is a horizontal cross-sectional view taken on line 6—6 of FIG. 4.
FIG. 7 is an enlarged view of a reversing-gear system forming part of the mechanism of FIG. 6.

FIGS. 4 and 6, respectively representing a lateral and a horizontal cross-section through the cylinder 3, show the parts contained within the center casing 12 of the frame 1. Each carrier 7 when pushed forward by the rollers 24, 24′, owing to its elevation as determined by the L-shaped stops 113, 113′, will slide between two guide profiles 311 and 312 which give the carrier a slight upward twist so that its top edge points in the direction of clockwise rotation of the cylinder as viewed in FIG. 4. The stroke of the reciprocating levers 23, 23′ is large enough to feed the carrier between the guide profiles until it is gripped by the guide rollers 30 and abuts, at its recessed shoulders 74, 74′, a pair of stops 301, 301′ projecting from cylinder 3.

At a predetermined location of the cylinder periphery there is provided a protruding dog 327 which actuates once every revolution a tripping contact 317, mounted on the center casing 12, in order to correlate the cylinder rotation with the feeding and clamping actions, as will be seen in the description of the electric control system.

The cylinder 3 has an envelope 32 made of a completely transparent material; the sound scanning is accomplished from within the cylinder through the transparent envelope. The driven side of the cylinder is closed by a metal disk 33 which carries the envelope and has a shaft 34 lodged in a journal 35 supported on the base of the apparatus. On the other side of the cylinder, a plurality of supporting rollers 37 are held by a portion 122 of the metal frame within the cylinder space so that the cylinder is free to rotate on the rollers, without impeding the action of the synchronized picture-scanning and sound-scanning heads 41 and 42. The edges of the transparent envelope 32 are engaged by a plurality of freely rotating, resilient guide rollers 30. When a carrier 7 is fed to the cylinder, these rollers press the carrier against the envelope, pair by pair, as the cylinder rotates.

The mass of the cylinder 3, augmented if necessary by suitable reinforcements, should be large enough to insure substantially uniform speed of rotation.

A clamping bar 323 runs parallel to the cylinder envelope and terminates in a pair of clips 322, 322′ protruding at either side so as to engage the outer surface of carrier 7. These clips are normally kept in contact with the carrier by the action of a spring 321; only during the stripping and feeding phase does the clamping solenoid 329 pull up and disengage the clips with its armature 326, through the intermediary of lever 324, for a short period.

A carrier-sensing contact 328 is mounted on the transparent envelope 32 of the cylinder opposite clip 322′. Contact 328 conductively engages the clip 322′ when, upon completion of the carrier-clamping action, no carrier is present to act as an insulator between the clip and the contact. In a manner to be described together with the other functions of the electric control circuit, this arrangement will prevent the reproducer from running idle and will stop it after the last carrier of a stack has been reproduced.

The electrical connections of both the solenoid 329 and the contact 328 are completed through a plurality of sliding contacts or brushes 382, 392 and 392′, mounted on the rotating cylinder disk 33, and a corresponding number of annular contact strips 381, 391 and 391′, respectively, the latter being carried on a stationary disk 318 mounted within the center casing 12.

The entire sound and picture reproducer is driven by a common electric motor 51 mounted, with its associated speed-reduction gear 50 in the proximity of the cylinder shaft 34. The driving shaft 52 carries the helical gear 521 which acts upon a similar gear 341 fixed to the shaft 34 of the cylinder. The transmission ratio of both the reduction gear 50 and the helical gears 521, 341 is so chosen that, for given carrier and picture-frame sizes, the conventional scanning rate of about 24 frames per second will prevail during reproduction. Shaft 52 also carries helical gears 522 and 523 forming part of the drive for the scanning mechanism. The end of shaft 52 opposite the motor 51 is lodged in a journal 515.

The combined scanning mechanism including picture-scanning head 41 and sound-scanning head 42 is laterally translated on lead screws 417 and 427 respectively extending outside and inside cylinder 3 parallel to its axes. The scanners operate simultaneously, head 41 scanning the frames 732 (FIG. 3) on the outer surface of the carrier 7 while the head 42 picks up the sound tracks 711 from the inner carrier surface through the transparent envelope 32 of the cylinder.

The picture-scanning head 41, equipped with a conventional high-wattage projection lamp 411, has a rear mirror 410 for focusing the light beam and a condenser-lens system 412 which projects the concentrated bundle of light onto the carrier surface. The light rays from the surface of sheet 7 are reflected by a mirror drum 413 which splits up the continuous projection into a sequence of intermittent, substantially stationary images. To this end, the drum 413 has a predetermined number of facets 432 from which the light rays pass through an objective 414 whereby they are projected on a conventional screen erected or suspended at a certain distance in the longitudinal axis of the reproducer. The previously mentioned helical gear 522 of the driving shaft 52 meshes with gear 532 of shaft 53; this shaft carries at its other end a second helical gear 531 which meshes with the teeth 431 of the multi-faceted mirror 413. The transmission ratio between cylinder 3 and mirror drum 413 is, of course, so chosen that the number of operative facets per second corresponds to the rate of picture scanning.

Figure 5:
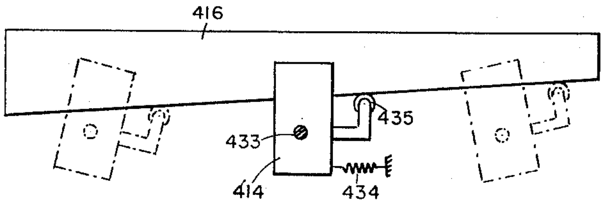
FIG. 5 is a somewhat diagrammatic top view of a projection-parallax equalized forming part of the equipment shown in FIG. 4.

FIG. 5 shows a special parallax equalizer associated with the picture-reproducing system of FIG. 4. In order to compensate the parallactic deviation of the projected image which is due to the travel of the scanning head 41 perpendicular to the longitudinal axis of the reproducer, the projection objective 414 is made angularly displaceable around a fulcrum 433. The objective is held with its roller 435 against a beveled guide ledge 416 which is mounted on the center casing 12; a spring 434 presses the roller firmly against the ledge, regardless of the beveling angle. Thus, as the scanner 41 is moved from one side of the cylinder to the other, the projected picture will always be centered on the remote screen (not shown).

Again referring to FIGS. 4 and 6, the sound-scanning head 42 is equipped with a conventional exciter lamp 421, an optical system 422 and a photo-electric cell 423. The output of this cell is fed to an amplifier 605 and from there to a loudspeaker 608 (FIG. 8) which is preferably arranged near the projection screen.

Both the picture scanner 41 and the sound scanner 42 are normally free to slide along the cylinder envelope on their respective guide rods 418 and 428. The scanners also embrace their associated lead screws 417 and 427 which terminate in respective helical gears 437 and 426. These latter mesh with helical gears 577 and 576, respectively, on an intermediate shaft 57; by this means the two interconnected lead screws and the scanners moving thereon will perform a simultaneous and unidirectional motion if the scanners are brought into positive engagement with their respective lead screws.

The electrical parts of both the picture and the sound scanner are interconnected with the rest of the electrical system by means of flexible cables (not shown) which allow free lateral movement of the heads 41, 42.

The previously mentioned helical gear 523, attached to the extremity of the driving shaft 52, drives a helical gear 543 on a stud shaft 54; this shaft carries a bridge 55 supporting a set of reversing gears which are controlled by the armature 516 of a solenoid 519. FIG. 7 shows an enlarged view of the reversing-gear system. A spring 511 holds the bridge 55 and the gears journaled thereon in a normal position, to be called hereafter the forward direction, when the scanner mechanism will move from the upper to the lower end of cylinder 3 as view in FIG. 6. The other end of shaft 54 carries a gear 542 which is in continuous engagement with a gear 546, mounted on one arm of the bridge, and also with a gear 544 and an associated intermediate gear 545, both mounted on another arm of said bridge. In the forward sense of roation, gear 546 is brought into mesh with a gear 436 of lead screw 417; when the solenoid 519 is energized, however, the bridge 55 is rotated counterclockwise around its fulcrum formed by shaft 54 so that gear 545 will mesh with gear 436, whereby a reverse motion is imparted to lead screw 417. The same reversal occurs on the synchronously driven second lead screw 427.

The scanners 41, 42 are translated by the lead screws 417, 427 only when they are coupled to them. To this end, scanner-coupling solenoids 419 and 429 are provided as shown in FIG. 8; in their energized condition their armatures 45, 46 will grip the respective lead screws and move the scanners, according to the sense of rotation, either to the right or to the left of the cylinder.

A limit switch 47 is mounted at the left-hand end position of the picture scanner 41, and a similar limit switch 48 at the right-hand end position. Each of them includes a make contact 471, 481 and a switchover contact 472, 482, respectively. They are operated in the extreme scanner positions by the tripping action of dogs 438' and 438 mounted at opposite sides of picture scanner 41. These switches remain unoperated while the scanner is in any intermediate position.

At the front side of the center casing 12, opposite the feeding machanism, there is a stripping machanism which removes the carrier from the cylinder once the reproduction cycle is over. An arm 26 is actuated by the armature 266 of the stripping solenoid 269 mounted in the base portion of the center casing. A spring 261 counteracts the solenoid and restores this arm to its rest position. The upper end of arm 26 carries a slidable stripping profile 27. When the solenoid 269 is energized, the profile 27 is urged into close proximity of the cylinder and disengages the leading edge of sheet 7 from the stops 301, 301'. At the same time the clips 322, 322' release the carrier sheet whereupon the latter will tend to resume its plane shape and, as the cylinder continues its rotation, will slide down the far slope of profile 27 into the collecting tray 13 at the front portion of the reproducer.

Figure 8:
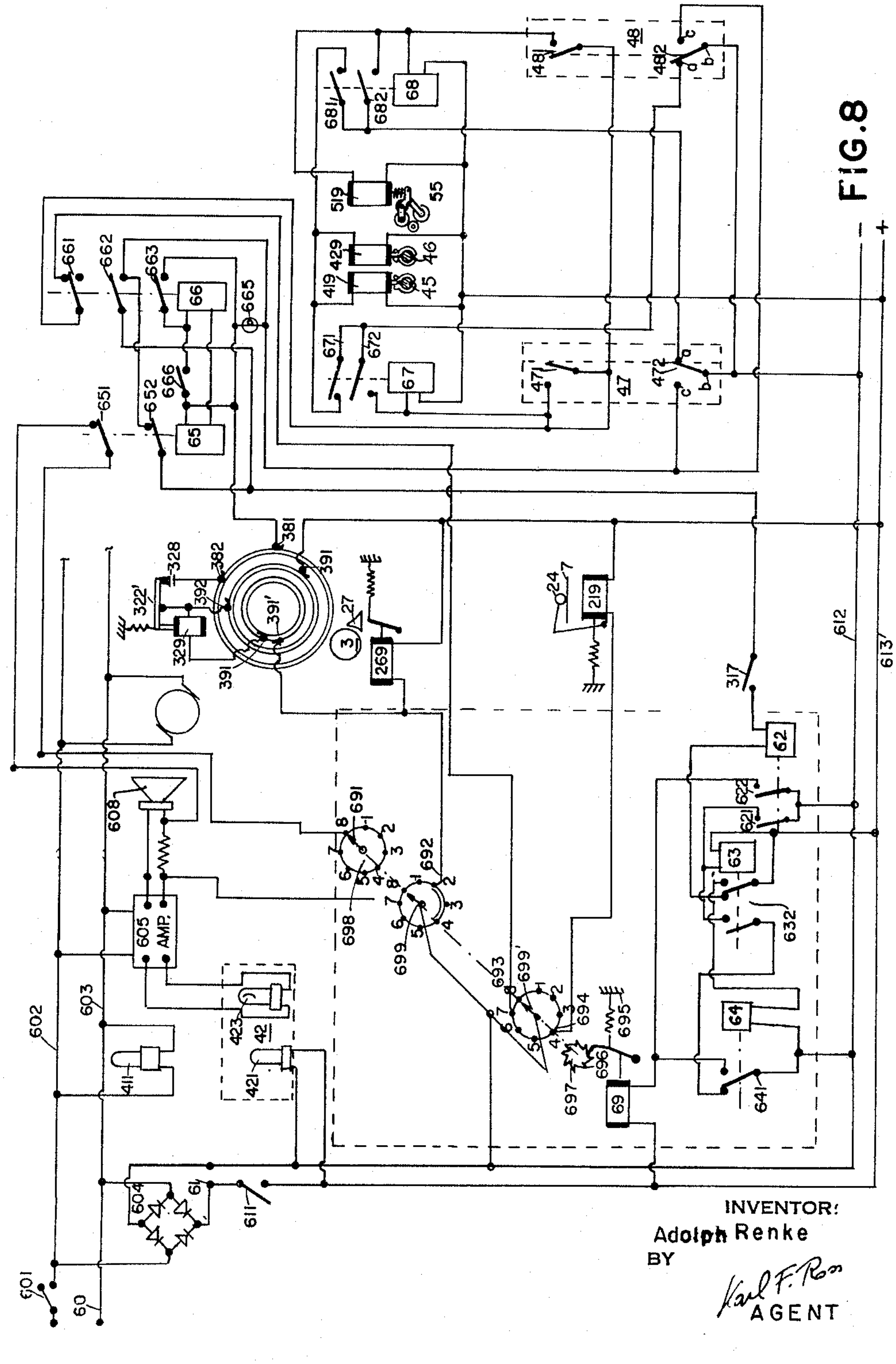
FIG. 8 represents the complete electrical circuit diagram of the apparatus shown in the preceding figures.

Reference will now be made to FIG. 8 for a description of the mode of interaction of the above-mentioned components. The phases of carrier stripping, new-carrier feeding, scanning, and automatic stoppage are combined, in the embodiment shown in FIGS. 1–8, into a four-stage cycle two of whose stages differ only in the direction of scanning. The forward and reverse reproduction cycles alternate with the feeding cycle in the right-hand and left-hand extreme positions of the scanning mechanisms. For this system, the even-numbered and the odd-numbered carrier sheets have to be printed with alternating tracks which run from the top left towards the bottom right for the odd, and from the top right towards the bottom left for the even carriers (as viewed in FIG. 3). At the end of the feeding cycles a sensing pulse will ascertain whether a carrier has been properly clamped on the cyclinder; in case of any disturbance, or when the stack of carriers has been exhausted, the reproducer will automatically stop and give a luminous signal to show that action has to be taken for resuming operation.

The sound and picture reproducer is fed with alternating current at treminals 60; a master switch 601 is provided for switching off the entire apparatus. The projection lamp 411, the amplifier 605 and the driving motor 51 are fed directly from the A.-C. mains 602, 603; so is the bridge rectifier 604 which supplies at terminals 61 the D.-C. voltage required for the sequence switch 69, the several relays and the solenoids. Here again a switch 611 is provided for cutting off the control system. The exciter lamp 421 is energized from the D.-C. bus bars 612, 613.

Let us consider the starting of the apparatus with the scanners 41, 42 in their extreme top position (as viewed in FIG. 6, sequence switch 69 in its home position "8" and switches 471, 472 thrown by the dog 438' of scanner 41. From pole "c" of switch 472, through the break contact 652 of sensing relay 65, a current path is prepared via contact 317 to the first-stage relay 62 of a stepping circuit which energizes the sequence switch 69. During every revolution of the rotating cylinder 3, contact 317 makes and transmits a pulse to relay 62. Armature 622 engages its contact whereupon sequence switch 69 pulls up and pushes ratchet wheel 697 to the next position, marked "1" by means of the armature 696 counteracted by traction spring 695. A second armature 621 of relay 62 also energizes the second-stage relay 63 which, at the back contact of its armature 632 breaks the energizing circuit of relay 62, thus limiting the duration of the pulse sent to the sequence switch as relay 62 releases immediately upon the operation of relay 63. Relay 63 locks via its armature 631 and at the front contact of its armature 632 energizes the third-stage relay 64. This relay, in turn, has two functions; its armature 641 interrupts at its back contact the holding circuit of relay 63 while transmitting over its front contact a second pulse to sequence switch 69, thereby stepping the latter to its position "2". The total play of relays 62, 63 and 64 is shorter than one revolution of the cylinder; thus, the sequence switch 69 will make two steps for each cylinder revolution, until tripped again by contact 317.

In positions "2" to "4" of the sequence switch the wiper 699 touches contact segment 692 to energize the stripping solenoid 269 and, through contact strips 391, 391' and brushes 392, 392', also the clamping solenoid 329. In position "4" of the sequence switch, in addition, wiper 699' touches bank contact 694 through which the feeding solenoid 219 is energized for the period of a short stroke. After position "4," owing to the actions of these solenoids, any carrier sheet 7 left on the cylinder from a previous reproduction has been removed and a new one (if available in the storage portion 11 of the frame) has been fed to the rotating cylinder. The case in which no carrier was clamped on the cylinder during phase "4" will be discussed somewhat later in connection with relays 65, 66.

After another turn of the cylinder and consequently two further steps (positions "5" and "6") of the sequence switch, scanning is initiated in position "7" by wiper 699' touching another bank contact 693 which, through the back contact and armature 661 of relay 66 and through the closed contact 471 (scanner 41 being still in its extreme left-hand position at the top of FIG. 6), energizes scanning relay 67 and, through its front contact and armature 671, operates the scanner-coupling solenoids 419, 429; relay 67 locks over its armature 672. These solenoids, arranged within the scanner systems 41, 42 on the lead screws 417, 427, positively engage their respective armatures 45, 46 with the rotating lead screws. Since the reversing solenoid 519 is not energized, gear 436 of lead screw 417 is driven in the previously identified forward direction. Scanning starts from the left of the cylinder to its right, with the result that contacts 471 and 472 return to their quiescent position and open the operating circuit for relay 62 so that the sequence switch 69 remains in its home position "8." Wiper 698 now short-circuits, through its bank contact 691, the resistor 607 which is in series with loudspeaker 608 in the output circuit of amplifier 605; the back contact 651 of relay 65 is also serially included in this output circuit. Thus, the full output of the amplifier is available in position "8" to the loudspeaker which in all other positions of the sequence switch is throttled by the series resistor so as to suppress any noises which might be picked up by the photo-electric cell during the feeding cycle.

The scanning relay 67 locks via its armature to pole "*a*" of contact 482 which interrupts this circuit as soon as the scanner reaches its right-hand end position at the bottom of FIG. 6. Pole "*c*" of the same switch prepares, again through the back contact 652 of relay 65, a new stripping and feeding phase under the control of contact 317, relay chain 62 to 64 and sequence switch 69, as previously described. In this phase, however, owing to the closed condition of actuated contact 481, reverse-scanning relay 68 will be energized, thereby feeding again the scanner-coupling solenoids 419, 429 through its armature 681 and also the reversing solenoid 519 through its holding armature 682. The lead screws are consequently driven in reverse direction so that scanning occurs from right to left. Armatures 681, 682 are fed through pole "*a*" of contact 472 which will be thrown over when the scanners reach its extreme left-hand position. Thereupon the four operational phases start all over again.

Let us now assume the condition in which no carrier was clamped on cylinder 3 in position "4" of the sequence switch, either because of faulty feeding or clamping, or because the last carrier of a stack had just been reproduced. In position "5," as soon as clamping solenoid 329 is released and clips 322, 322′ engage the cylinder surface, contact 328 makes because there is no insulation between the conductive elements 322′ and 328. Through brushes 382, 392 and contact strips 381, 391, positive potential from bus bar 613 is connected to sensing relay 65 which, in attracting its armature 652 interrupts the current path leading to contact 317 so that the sequence switch does not proceed beyond its position "6"; at armature 651 it disables the loudspeaker 608 regardless of the sequence-switch positions. In parallel with relay 65, pilot lamp 665 lights and calls the operator's attention to the irregularity of operation.

When a single carrier or a stack of carriers has again been placed in the apparatus, a re-starting switch 666 has to be actuated for a moment so as to start a repeat feeding cycle. Repeat-feeding relay 66 is thereby energized, with the following results: Armature 663 holds relay 66 and lamp 665 operated, but only so long as relay 65 is kept energized through contact 328; armature 662 restores the current path of contact 317, thereby tripping the relay chain 62–64 and the sequence switch 69 in the aforedescribed manner; finally, armature 661 suppresses the pulse coming from contact 693 in position "7" of the sequence switch which would start the scanning action by energizing either the forward-scanning relay 67 or the reverse-scanning relay 68 (according to the conditions of limit switch contacts 471 and 481). Owing to the pulses of contact 317 and the action of relays 62–64, a four-stage cycle similar to the one previously described now progresses through switch positions "7," "8," "1" and "2" while a new carrier sheet 7 is fed to the cylinder 3. The clamping solenoid 329 being energized in position "2," whereby the circuit through contact 328 is opened, both relays 65 and 66 drop and the regular operating steps follow according to the previously described control action of the sequence switch in its subsequent positions. In position "8," with the input circuit of loudspeaker 608 again closed at armature 651, full sound volume is reinstated upon the engagement of bank contact 691 by wiper 698, and a normal reproduction phase follows. The sensing relay 65 and the repeat-feeding relay 66 are operative in either direction of reproduction as long as the scanning heads 41, 42 are left in either of their extreme positions.

In the event that a stack of carriers 7 previously reproduced consisted of an odd number of sheets, the heads 41, 42 will find themselves at the beginning of a "reverse" scanning cycle which would be unsuitable for the reproduction of the first sheet of a new stack. Under these conditions the scanning mechanism can be displaced by hand from one extreme position to the other (e.g. from right to left) before re-starting switch 666 is closed.

Figure 9:
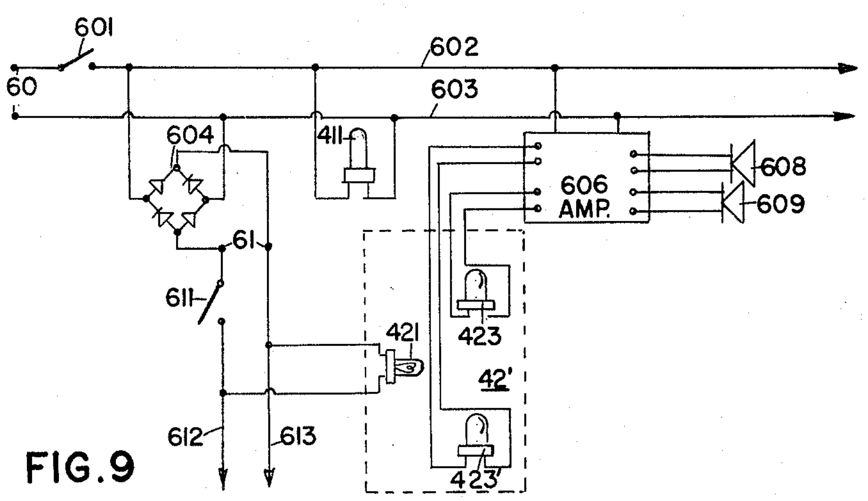
FIG. 9 is a partial circuit diagram of a modified reproducer having a double sound scanner.

FIG. 9 shows part of a modified reproducer wherein two staggered photocells 423 and 423′ are provided. These photocells are juxtaposed on one carriage 42′ and have a common mechanical drive of the type described with reference to FIGS. 4 and 6. With this arrangement it is possible to scan a carrier with double sound track, generally similar to the sheet 7 of FIG. 3, so as to reproduce the acoustic part of the message on the carrier in a binaural manner. For this purpose the outputs of photocells 423, 423′ are transmitted through a two-channel amplifier 606 to two loudspeaker systems 608 and 609. If the two sound tracks are identical but angularly staggered on the carrier, this system may also be used to overcome slight interruptions at the junction points of the leading and trailing carrier edges. In this case the photocell 423′ will pick up an uninterrupted track portion while the cell 423 just scans the sheet edges. Other parts of the circuit, not shown in FIG. 9, may be the same as in the preceding embodiment.

Figure 10:
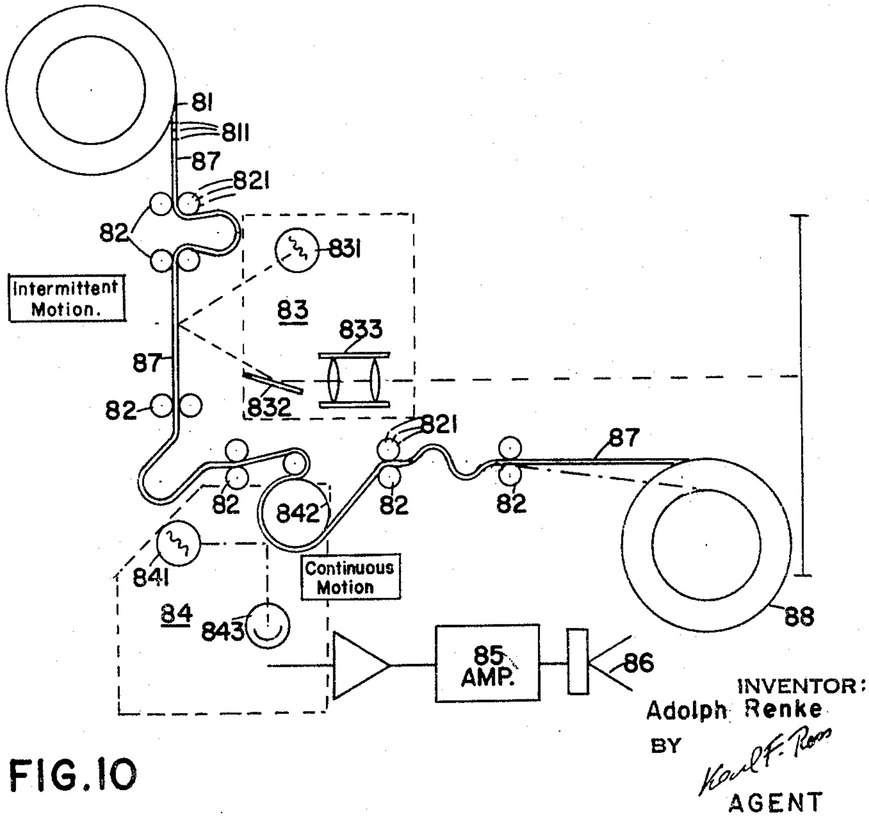
FIG. 10 shows, somewhat schematically, another embodiment of a reproducer according to the invention.

FIG. 10 shows a reproducer according to the invention whose carrier 87 is a paper or plastic strip preferably provided with perforations 811 engageable by the conventional teeth 821 of the pairs of feed rollers 82. The strip carrier is unwound from a storage reel 81 and fed with the usual intermittent motion to a projector 83 where its front is scanned by means of light source 831, mirror 832 and objective 833. Having passed a number of additional feed and deflecting rollers 82, the strip carrier 87 reaches the sound-scanning system 84 where an exciter lamp 841 illuminates the rear of the strip portion passing in continuous motion around a flywheel 842; the light modulations are picked up by the conventional photo-electric cell 843 and, translated into electrical oscillations, are transmitted to amplifier 85 and loudspeaker 86 in the well-known manner. Finally the strip carrier is transported, by means of still other rollers 82, to a wind-up reel 88. Strip 87 may likewise be provided with two sound tracks for purposes of binaural reproduction, as described in connection with FIG. 9.

Various modifications of the system described hereinabove will be readily apparent to persons skilled in the art, in the light of the preceding disclosure, and are intended to be embraced in the scope of the invention as defined in the appended claims. Thus it will be understood, for example, that by a simple reversal of the mounting arrangement in the embodiment of FIGS. 1–8 the scanning heads 41, 42 could be held stationary while their lead screws 417, 418 together with cylinder 3 and associated driving elements could be axially displaced in the rhythm of the scanning sweep, thereby dispensing with the need for a parallax equalizer as illustrated in FIG. 5. Again, the speed of motor 51 could be varied by a simple switchover arrangement (e.g. under the control of reversing relay 68) so as to make the return sweep of the scanning system considerably more rapid than its forward sweep, the same switchover arrangement causing the omission of the feeding cycle during the return sweep so that carrier sheets 7 will be fed to the cylinder 3 only for the forward scan; in this case the image sequences 731 and the sound tracks 711 on all sheets 7 would slant in the same direction. Furthermore, two reproducers as shown in FIGS. 1–8 could be connected in tandem so that one would scan a message sheet while the other runs idle on the return cycle, and vice versa. Finally, details of the electrical and mechanical connections described above and shown in the drawing may be replaced by equivalent arrangements well known per se.

It will also be apparent that the device shown in the drawing may be readily modified, through substitution of conventional photographic recording equipment for the optical and acoustic pickup means on the scanning heads 41, 42, to be utilizable in the manufacture of an original master record from which any number of copies could then be printed.

I claim:

1. In a combined picture and sound reproducer, in combination, a rotatably mounted transparent cylinder provided with means for supporting on its periphery a carrier sheet having a front side bearing an image sequence and a rear side bearing a sound track correlated with said image sequence, scanning means including optical pickup means positioned to face said front side and sound-pickup means positioned to face said rear side, and mechanism for relatively displacing said carrier and said scanning means along a helical path.

2. The combination according to claim 1 wherein said optical pickup means is positioned outside said cylinder, said sound-pickup means being positioned within said cylinder.

3. The combination according to claim 2 wherein each of said pickup means comprises a respective lead screw extending parallel to the cylinder axis and a respective scanner head operatively engageable with said lead screw, said scanning means further including coupling means for rotating said lead screws in unison.

4. The combination according to claim 1 wherein said sound-pickup means includes a pair of photo-electric transducers aligned with different helical tracks on said cylinder and relatively staggered in the direction of scanning displacement of said carrier sheet.

5. The combination according to claim 1, further comprising feed means for successively delivering to said cylinder a series of carrier sheets to be mounted on said cylinder.

References Cited in the file of this patent

UNITED STATES PATENTS

| | | |
|---|---|---|
| 1,864,519 | Boularan et al. | June 28, 1932 |
| 1,913,913 | Boularan et al. | June 13, 1933 |
| 1,974,688 | Myers | Sept. 25, 1934 |
| 2,005,914 | Freund | June 25, 1935 |
| 2,101,121 | Wixon | Dec. 7, 1937 |
| 2,587,433 | Bentley et al. | Feb. 26, 1952 |
| 2,647,437 | Bentley et al. | Aug. 4, 1953 |